(12) United States Patent
Kuenzi et al.

(10) Patent No.: US 11,758,599 B2
(45) Date of Patent: *Sep. 12, 2023

(54) BLUETOOTH™ LOW ENERGY DATA TRANSFER COMMUNICATION SYSTEM AND METHOD

(71) Applicant: CARRIER CORPORATION, Palm Beach Gardens, FL (US)

(72) Inventors: Adam Kuenzi, Silverton, OR (US); Michael Lang, Oregon City, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,820

(22) Filed: Feb. 7, 2022

(65) Prior Publication Data

US 2022/0159755 A1    May 19, 2022

Related U.S. Application Data

(63) Continuation of application No. 16/616,732, filed as application No. PCT/US2018/028520 on Apr. 20, 2018, now Pat. No. 11,246,176.

(Continued)

(51) Int. Cl.
*H04W 76/00*  (2018.01)
*H04W 76/14*  (2018.01)
(Continued)

(52) U.S. Cl.
CPC ........ *H04W 76/14* (2018.02); *G07C 9/00309* (2013.01); *G07C 9/00571* (2013.01);
(Continued)

(58) Field of Classification Search
CPC ......... H04W 76/14; H04W 4/23; H04W 4/80; G07C 9/00309; G07C 9/00571; G07C 2009/00769
See application file for complete search history.

(56) References Cited

U.S. PATENT DOCUMENTS 4,864,301 A   9/1989  Helferich
8,849,202 B2  9/2014  Linde et al.
(Continued)

FOREIGN PATENT DOCUMENTS

CA    2946630 A1    4/2014
CN   103684550 A    3/2014
(Continued)

OTHER PUBLICATIONS

Https://www.blackhat.com/docs/us-a6/materials/us-16-Jasek-GATTacking-Bluetooth-Smart-Devices-Introducing-a-New-BLE-Proxy-Tool-wp.pdf.
(Continued)

*Primary Examiner* — Khai M Nguyen
(74) *Attorney, Agent, or Firm* — Bachman & LaPointe, P.C.

(57) ABSTRACT

A method for data transfer includes establishing a first wireless connection between a transceiver and a handheld device, the transceiver initially operating in an peripheral role and the handheld device operating in a central role; switching a role of both the transceiver and the handheld device in response to establishing the first wireless connection, the transceiver module switching from the peripheral role to the central role, and the handheld device from the central role to the peripheral role; and establishing a second wireless connection between the transceiver and the handheld device subsequent to the switching.

19 Claims, 4 Drawing Sheets

Related U.S. Application Data

(60) Provisional application No. 62/513,673, filed on Jun. 1, 2017.

(51) Int. Cl.
*H04W 4/23* (2018.01)
*H04W 4/80* (2018.01)
*G07C 9/00* (2020.01)

(52) U.S. Cl.
CPC .............. *H04W 4/23* (2018.02); *H04W 4/80* (2018.02); *G07C 2009/00769* (2013.01)

(56) References Cited

U.S. PATENT DOCUMENTS

| | | | |
|---|---|---|---|
| 8,874,034 B2 | 10/2014 | Walley et al. | |
| 8,964,586 B2 | 2/2015 | Xhafa et al. | |
| 8,971,807 B2 | 3/2015 | Hillyard | |
| 9,008,917 B2 | 4/2015 | Gautama et al. | |
| 9,112,986 B2 | 8/2015 | Tucker et al. | |
| 9,288,759 B2 | 3/2016 | Kerai et al. | |
| 9,319,828 B2 | 4/2016 | Decuir et al. | |
| 9,332,376 B2 | 5/2016 | Knaappila | |
| 9,351,330 B2 | 5/2016 | Weizman et al. | |
| 9,363,010 B2 | 6/2016 | Lee et al. | |
| 9,414,217 B2 | 8/2016 | Knaappila | |
| 9,483,887 B1 | 11/2016 | Soleimani | |
| 9,504,077 B2 | 11/2016 | Newham et al. | |
| 9,531,501 B2 | 12/2016 | Linde et al. | |
| 9,635,495 B2 | 4/2017 | Kwan et al. | |
| 9,854,621 B2 | 12/2017 | Wang et al. | |
| 9,882,957 B1 | 1/2018 | Mostert | |
| 10,142,750 B2 | 11/2018 | Hariharan et al. | |
| 10,165,612 B2 * | 12/2018 | Zeung | H04W 84/20 |
| 10,997,942 B2 * | 5/2021 | Kim | G06F 3/14 |
| 11,381,901 B2 * | 7/2022 | Li | H04R 5/033 |
| 2006/0072525 A1 | 4/2006 | Hillyard et al. | |
| 2012/0302170 A1 * | 11/2012 | Frazier | H04W 84/20 |
| | | | 455/41.3 |
| 2013/0316642 A1 * | 11/2013 | Newham | H04W 52/0206 |
| | | | 455/67.11 |
| 2014/0355582 A1 | 12/2014 | Kamath et al. | |
| 2015/0163846 A1 | 6/2015 | Weizman et al. | |
| 2015/0256968 A1 | 9/2015 | Terazaki et al. | |
| 2016/0014550 A1 | 1/2016 | Chiddarwar et al. | |
| 2016/0183077 A1 | 6/2016 | Wang et al. | |
| 2016/0189453 A1 * | 6/2016 | Johnson | H04W 4/023 |
| | | | 340/5.61 |
| 2017/0034647 A1 | 2/2017 | Takeuchi et al. | |
| 2017/0034856 A1 | 2/2017 | Takeuchi et al. | |
| 2017/0140589 A1 * | 5/2017 | Bender | G07C 9/00309 |
| 2018/0132183 A1 | 5/2018 | Gattu | |
| 2018/0240292 A1 * | 8/2018 | Chen | H04W 4/80 |
| 2019/0251768 A1 * | 8/2019 | Lakamraju | H04W 12/069 |

FOREIGN PATENT DOCUMENTS

| | | | | |
|---|---|---|---|---|
| CN | 104601203 A | 5/2015 | | |
| CN | 105959040 A | 9/2016 | | |
| EP | 3285234 A1 * | 2/2018 | | B60R 25/245 |
| JP | 2016165061 A | 9/2016 | | |
| WO | 2017070376 A1 | 4/2017 | | |

OTHER PUBLICATIONS

International Search Report dated Jul. 6, 2018 for PCT/US2018/028520.
EP Search Report dated Mar. 29, 2021 issued for corresponding European Patent Application No. 21154570.2.
Chinese Office Action dated May 7, 2021 issued for corresponding Chinese Patent Application No. 201880036578.9.
Chinese Office Action dated Dec. 12, 2021 issued for corresponding Chinese Patent Application No. 201880036578.9.

* cited by examiner

BLUETOOTH™ LOW ENERGY DATA TRANSFER COMMUNICATION SYSTEM AND METHOD

CROSS-REFERENCE TO RELATED APPLICATIONS

The instant application is a continuation of U.S. patent application Ser. No. 16/616,732 filed Nov. 25, 2019, which is a 371 of PCT/US2018/028520, filed Apr. 20, 2018, which claims benefit of U.S. Provisional Patent Application Ser. No. 62/513,673, filed Jun. 1, 2017.

BACKGROUND

The present disclosure relates generally to wireless communication systems, and more particularly, to a system and a method to increase Bluetooth™ Low Energy (BLE) communication performance of access controls.

Bluetooth™ networks are commonly referred to as piconets and consist of at least two devices, where one is the central (scanning) and the other is the peripheral (advertising). A Bluetooth™ central device scans and a peripheral device advertises. The central and peripheral roles are defined by the Bluetooth standard. Each device communicates with the other on a given period called a connection interval (minimum of 7.5 milliseconds that increases in steps of 1.25 milliseconds).

Bluetooth™ Low Energy (BLE) was released as Bluetooth™ 4.0. As with the previous (often called "Classic" Bluetooth™) protocol, BLE operates in the 2.4 GHz ISM band. Unlike Classic Bluetooth™, BLE remains in sleep mode constantly except for when a connection is initiated. The actual BLE connection times are only a few milliseconds, unlike Classic Bluetooth™ which are on the order of hundreds of milliseconds.

Compared to Classic Bluetooth™, BLE provides considerably reduced power consumption and cost while maintaining a similar communication range. With the very low power usage, one particular example usage of BLE is access control architectures such as a hotel room lock. Using BLE, access to the room can be achieved by the handheld device (e.g., wireless phone) without use of a physical key card. The low power usage capability of BLE allows the access control to always be on and sending advertisements. To maximize battery life, the advertisement rate for the BLE module in a hotel room lock is typically relatively slow such that the operational current draw is acceptable for an effective battery life expectancy (e.g., 2 years) without overly burdensome maintenance. The relatively slow rate at which the access control sends BLE advertisements, however, directly affects the time required to connect as after the user indicates an intent to open the lock, such as via an application on the handheld device, the handheld device must await the next advertisement before a connection with the hotel room lock is achieved.

When initiating the access control connection, the handheld device is scanning for advertisements and always serves as the central while the lock is advertising and always serves as the peripheral. This applies to all brands of handheld devices. Some handheld devices, however, inherently limit how fast the Bluetooth™ connection can operate by using a rather lengthy connection interval when connecting as the central device to prevent one peripheral from using all of the available resources of the central device. The Bluetooth™ standard puts the central in control of these limitations. For example: iOS central role connection interval minimum is 20-30 milliseconds; iOS peripheral role connection interval minimum is 7.5 milliseconds; Android™ central role connection interval minimum is 7.5 milliseconds; and Android™ peripheral role connection interval minimum is 7.5 milliseconds.

This extended time for the iOS central role connection interval may provide benefits in the support of connections that occur frequently, or are held open for relatively long periods of time, however, in access control architectures, this results in a relatively lengthy delay before lock actuation, (e.g., about 2.5 seconds compared to about 1.5 seconds for the Android™).

SUMMARY

A method for data transfer according to one disclosed non-limiting embodiment of the present disclosure includes establishing a first wireless connection between a transceiver and a handheld device, the transceiver initially operating in a peripheral role and the handheld device operating in a central role; switching a role of both the transceiver and the handheld device in response to establishing the first wireless connection, the transceiver module switching from the peripheral role to the central role, and the handheld device from the central role to the peripheral role; and establishing a second wireless connection between the transceiver and the handheld device subsequent to the switching.

A further aspect of the present disclosure includes, wherein the transceiver is a Bluetooth™ low energy (BLE) module that switches into the central role subsequent to the first wireless connection.

A further aspect of the present disclosure includes wherein the access control is a lock.

A further aspect of the present disclosure includes disconnecting the first wireless connection prior to establishing the second wireless connection.

A further aspect of the present disclosure includes maintaining the first wireless connection while establishing the second wireless connection.

A further aspect of the present disclosure includes advertising from the handheld device at a maximum advertising rate subsequent to switching the role thereof.

A further aspect of the present disclosure includes operating the first wireless connection interval at a normal transmission rate then operating the second wireless connection interval at a maximum transmission rate.

A further aspect of the present disclosure includes wirelessly transmitting advertisements from the transceiver according to a normal advertising rate for a Bluetooth™ low energy (BLE) module prior to establishing the first wireless connection.

A method for data transfer according to one disclosed non-limiting embodiment of the present disclosure includes wirelessly transmitting advertisements from an access control; establishing a first wireless connection between the access control and a handheld device; switching the access control to a central role from a peripheral role in response to the first wireless connection; switching the handheld device to a peripheral role from a central role in response to the first wireless connection; and establishing a second wireless connection between the access control and the handheld device.

A further aspect of the present disclosure includes disconnecting the first connection prior to establishing the second connection.

A further aspect of the present disclosure includes, wirelessly transmitting advertisements from the access control according to a normal advertising rate prior to establishing the first connection.

A further aspect of the present disclosure includes wirelessly transmitting advertisements from the handheld device at a maximum transmission rate subsequent to the first wireless connection.

A further aspect of the present disclosure includes wherein wirelessly transmitting advertisements at the maximum rate is at a rate of 32 times per second.

A further aspect of the present disclosure includes wherein the handheld device commands the access control to switch into the central role subsequent to the first wireless connection.

A further aspect of the present disclosure includes disconnecting the first wireless connection prior to establishing the second wireless connection.

A handheld device according to one disclosed non-limiting embodiment of the present disclosure includes a transceiver operable to provide both a Bluetooth™ low energy (BLE) central role and a Bluetooth™ low energy (BLE) peripheral role; a power supply; a memory to store executable instructions; and a processor in communication with the memory and the power supply, the processor operable to execute the executable instructions to switch the transceiver from the Bluetooth™ low energy (BLE) central role to the Bluetooth™ low energy (BLE) peripheral role in response to an initial connection with an access control.

A further aspect of the present disclosure includes, wherein the executable instructions command the access control to switch to a central role from a peripheral role subsequent to the first wireless connection.

A further aspect of the present disclosure includes, wherein the transceiver is initially operating in the Bluetooth™ low energy (BLE) central role to receive advertisements.

A further aspect of the present disclosure includes, wherein the handheld device is a phone.

A further aspect of the present disclosure includes wherein the access control is a lock.

The foregoing features and elements may be combined in various combinations without exclusivity, unless expressly indicated otherwise. These features and elements as well as the operation thereof will become more apparent in light of the following description and the accompanying drawings. The following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
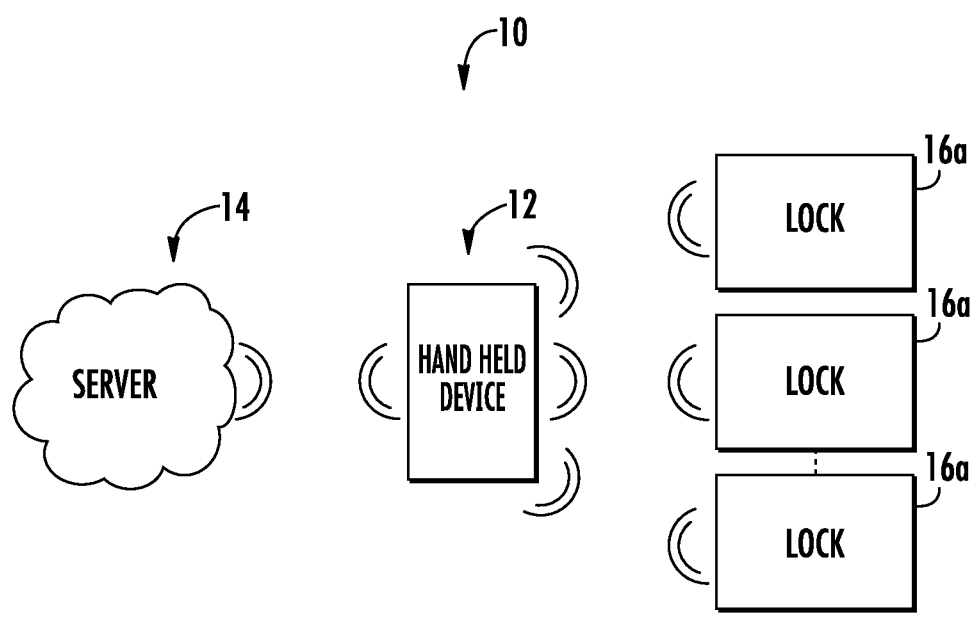
FIG. 1 is a general schematic system diagram.

FIG. 1 schematically illustrates an example electromechanical lock system 10. The system 10 generally includes a handheld device 12, a server 14, and a plurality of access controls 16, schematically illustrated as 16a, 16b, . . . , 16n. Although particular components are shown in the schematic block diagrams, each or any may be otherwise combined or separated via hardware and/or software. Further, although each access control 16 disclosed in the illustrated embodiment is a lock such as a hotel door lock, any device that utilizes a Bluetooth™ Low Energy (BLE) module will benefit herefrom.

"Handheld device" refers to a portable electronic device that is at least configured to send messages to, and/or receive messages from, a server over a long-range wireless communication network, such as a SMS, wireless, or cellular network. Examples of handheld devices include, but are not limited to: wireless phones; tablets, personal digital assistants ("PDA"); portable computers; and the like.

"Server" conveys its customary meaning and further includes a corporate datacenter that provides service for data connection, e.g., to a handheld device and/or an electronic locking device. Although the server 14 is depicted as a single device, it should be appreciated that the server 14 may alternatively be embodied as a cloud, a multiplicity of systems, or other architecture, from which the handheld device 12 receives credentials and other data.

The handheld device 12, in this example, includes a BLE module for communication with the access controls 16, and is also operable to communicate with the server 14 via other communication protocols such as via a cellular network. The server 14 provides credentials and other data to the handheld device 12, which may then be communicated to one or more of the access controls 16 for authentication, then actuation of the appropriate access control 16.

Each access control 16 in this example is a BLE capable lock (e.g., a hotel room lock that includes a BLE module), however other devices that utilize a BLE module such as readers for building entry, electronic banking controls (e.g., an ATM), data transfer devices, mobile dispenser devices, tool dispensing devices, and/or other restricted-use machines will also benefit herefrom.

In operation, once a connection is established, the handheld device 12 submits a credential to the appropriate access control 16, thereby selectively permitting a user to access or activate functions of the access control 16. In one example, the handheld device 12 submits the credential to an electromechanical lock to unlock the access control 16, and thereby gain access to a restricted area. In another example, the handheld device 12 may submit a credential to an electronic banking device to withdraw funds. In still another example, the handheld device 12 may submit the credential to a unit that dispenses access cards with data associated with, or data retrieved from, the credential. The handheld device 12 may store credentials for one or all of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
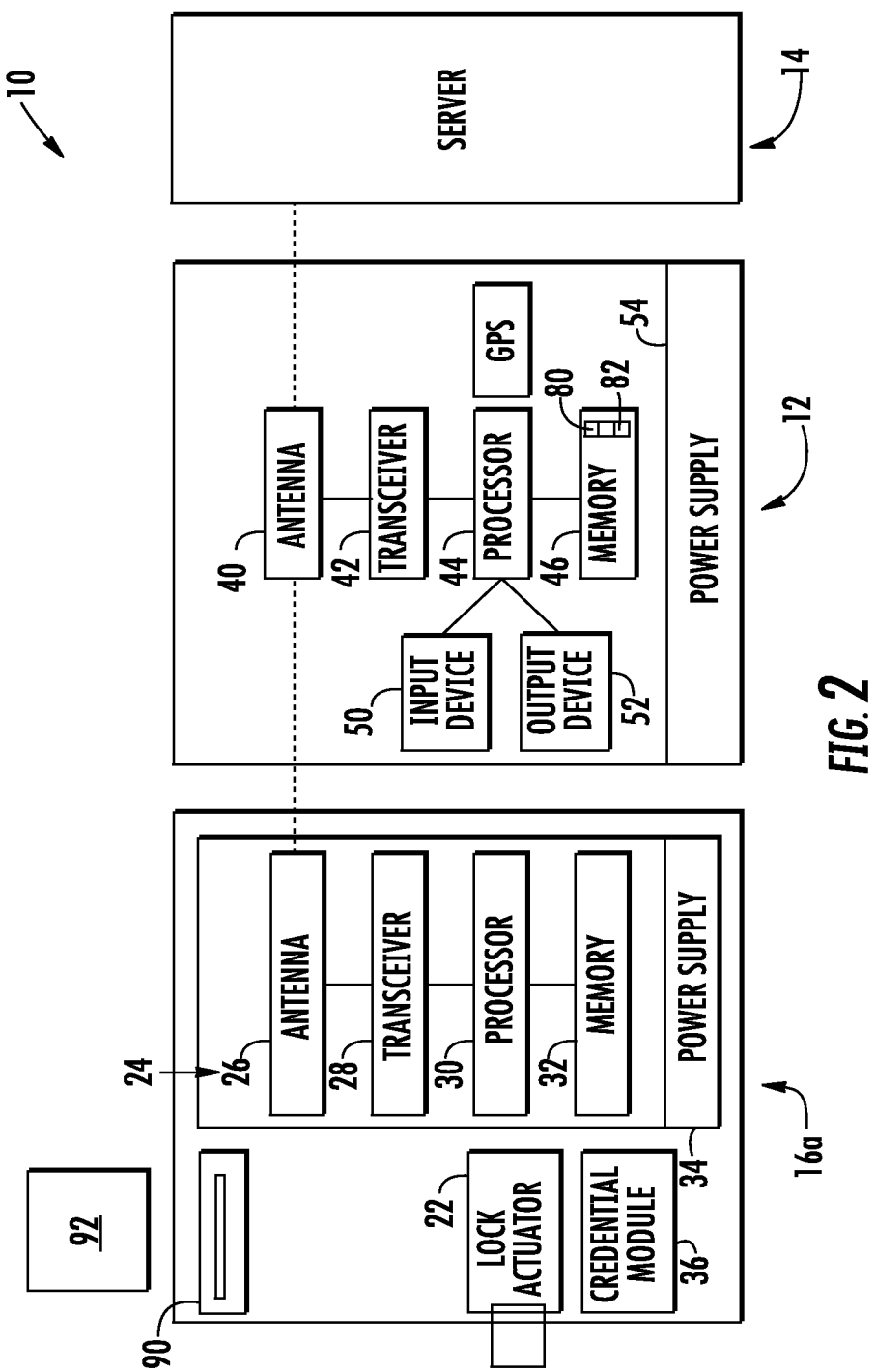
FIG. 2 is a block diagram of a handheld device and access control architecture.

FIG. 2 shows an example of the system 10 including one example access control 16a. The access control 16a generally includes an actuator 22 (e.g., an electromechanical lock core) and a controller 24. The controller 24 includes an antenna 26, a transceiver 28, a processor 30, a memory 32, a power supply 34, a card reader 90, and a credential module 36 as further discussed below. The controller 24 and the actuator 22 may be parts of a single electronic or electromechanical lock unit. Although the example is a lock, other systems wherein credentials are transmitted to identify a user, validate user access rights, or provide permissions, will benefit herefrom.

The transceiver 28 is capable of transmitting and receiving data to and from at least the handheld device 12. The transceiver 28 in this example is a BLE module for BLE communication, and/or appropriate wireless communication protocol such as a near field communication (NFC), Wi-Fi and/or another wireless transceiver. The antenna 26 is any antenna appropriate to the transceiver 28. The processor 30 and memory 32 are, respectively, data processing, and storage devices. The processor 30 may, for instance, be a microprocessor that can process instructions to validate card data and determine the access rights contained in the card data or to pass messages from the transceiver 28 to the credential module 36 and to receive a response indication back from the credential module 36 with card data. The memory 32 may be RAM, EEPROM, or other storage medium where the processor 30 can read and write data including but not limited to lock configuration options and the lock audit trail. The lock audit trail may be a unified audit trail that includes events initiated by accessing the lock via the card reader 90 or the handheld device 12. The power supply 34 is a power source such as line power connection, a power scavenging system, and/or a battery that powers the controller 24. In other embodiments, the power supply 34 may only power the controller 24, with the actuator 22 powered primarily or entirely by another source, such as user work (e.g., turning a bolt).

The credential module 36 is in communication with the processor 30 and is operable to decrypt and validate a credential to extract virtual card data communicated into the controller 24 as a virtual card read. The access control 16a may have one reader 90 to read a physical keycard 92 to obtain a physical card read and the credential module 36 to communicate with the handheld device 12 to obtain the virtual card read. Upon receiving and authenticating an appropriate credential from the handheld device 12 using the credential module 36, or after receiving and authenticating appropriate card data from the card reader 90, the controller 24 commands the actuator 22 to lock or unlock.

While the figure illustrates various particular modules, this is not to limit other embodiments that may have, for example, additional antennas and transceivers connected to the credential module 36 directly. The credential module 36 may contain the transceiver 28 and antenna 26 as part of the credential module or the credential module 36 may have the transceiver 28 and antenna 26 separately from the processor 30 which also has a separate transceiver 28 and antenna 26 of the same or different type. In some embodiments, the processor 30 may route communication received via transceiver 28 to the credential module 36. In other embodiments, the credential module 36 may communicate directly to the handheld device 12 through the transceiver 28.

The handheld device 12 generally includes a handheld device antenna 40, a handheld device transceiver 42, a handheld device processor 44, a handheld device memory 46, a GPS receiver 48, an input device 50, an output device 52, and a handheld device power supply 54. The handheld device processor 44 may be any type of microprocessor having desired performance characteristics. The handheld device memory 46 may include any type of computer readable medium that stores the data and executable instructions described herein below. A mobile application software, or mobile app, is an application software of executable instructions designed to run on handheld devices such as smartphones and tablet computers. The executable instructions may be stored or organized in any manner and at any level of abstraction, such as in connection with one or more applications, processes, routines, procedures, methods, etc. The handheld device transceiver 42 is a transceiver of a type corresponding to the transceiver 28, and the handheld device antenna 40 is a corresponding antenna. In some embodiments, the handheld device transceiver 42 and the handheld device antenna 40 may also be used to communicate with the server 14. In other embodiments, one or more separate transceivers and antennas may be included to communicate with the server 14.

The handheld device memory 46 may typically stores a plurality of credentials locally on the handheld device 12 to operate the access control 16. In other embodiments, the handheld device 12 communicates with the server 14 at the same time as it communicates to the access control 16. This is the online configuration, and in this embodiment, the mobile credential is retrieved in real time and is passed to the credential module 36 without storing first in the handheld device memory 46 on the handheld device 12.

Figure 3:
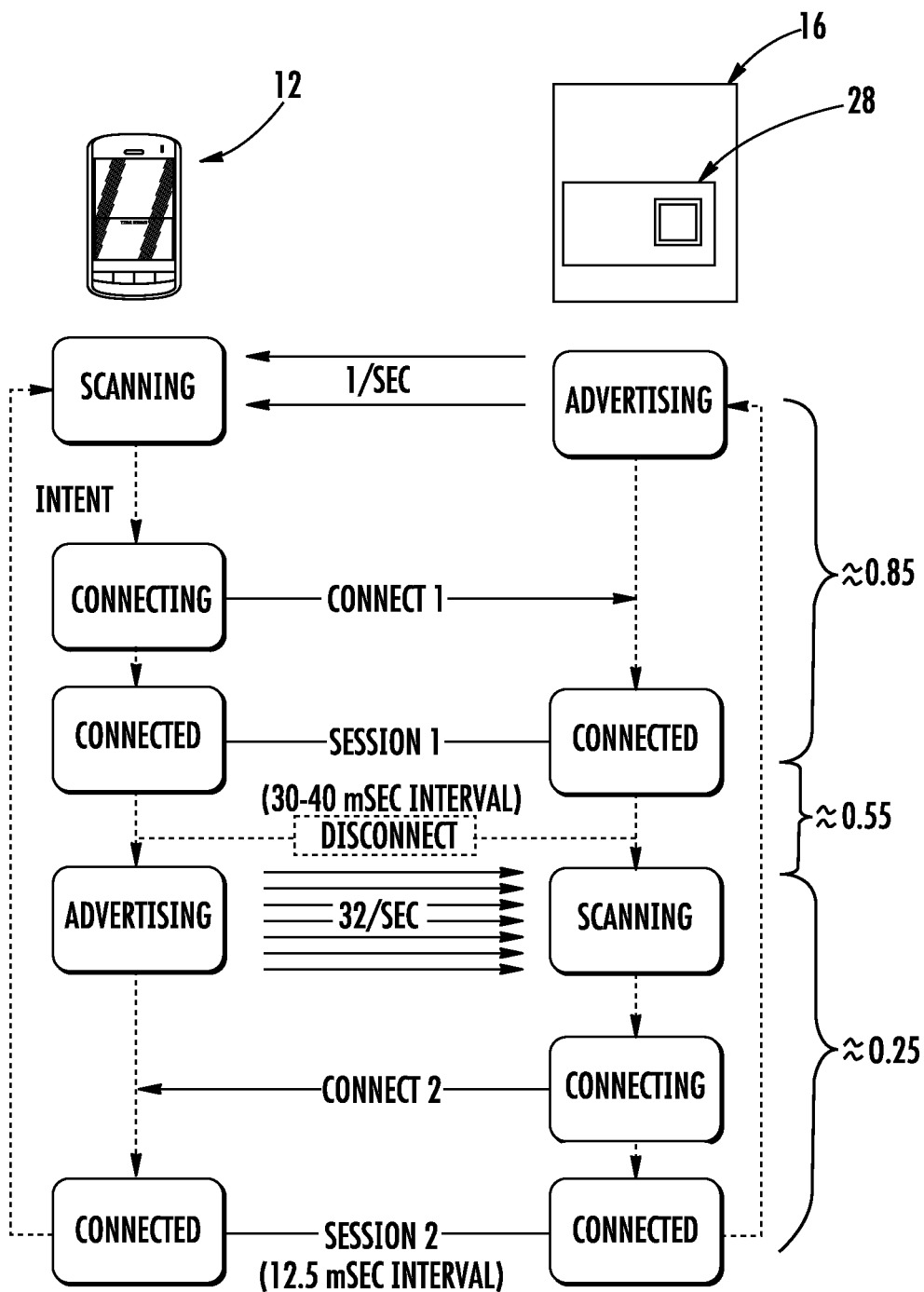
FIG. 3 is a block diagram of a method to transfer data.
Figure 4:
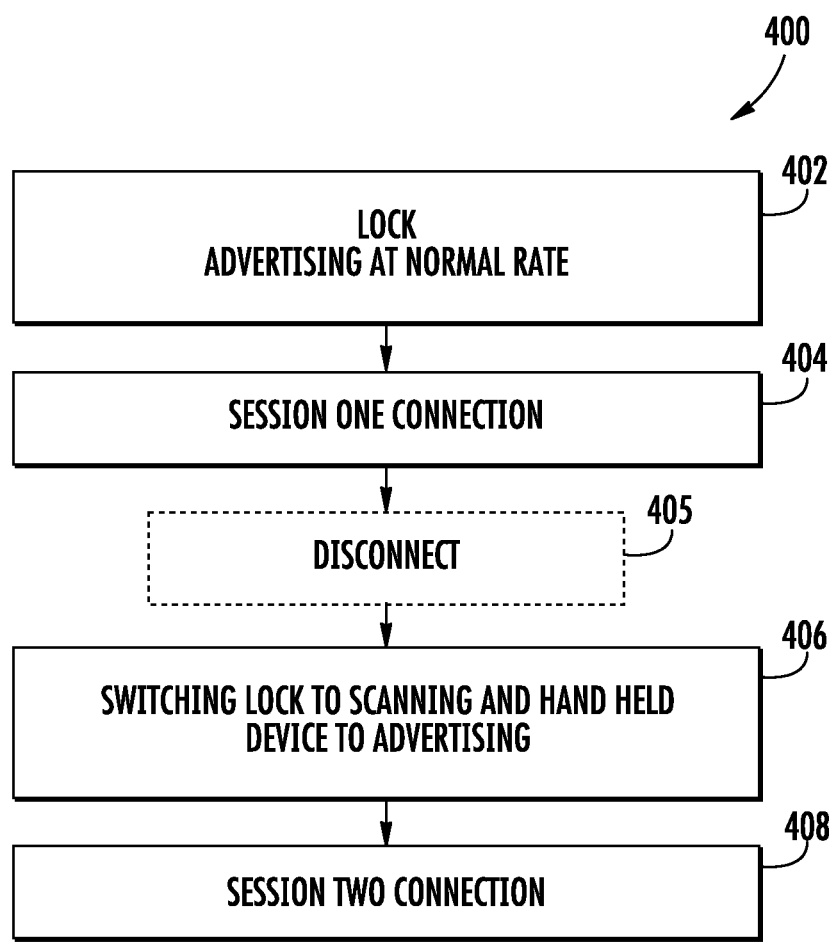
FIG. 4 is a flowchart of FIG. 3 of the method to transfer data according to one disclosed non-limiting embodiment.

With reference to FIG. 3 and FIG. 4, each access control 16 initially operates as the peripheral and advertises using, for example, BLE. That is, initially, and typically, the access control 16 is the peripheral and advertises, while the handheld device 12 is the central and is scanning for the advertisements. This initial advertising by the access control 16 as the peripheral, is typically performed at a relatively low normal advertising rate typical of the normal BLE operation.

The roles are then reversed in accordance with the method 400 illustrated in FIG. 4 to increase performance and facilitate higher user satisfaction. Further, a Bluetooth™ advertisement from the access control 16 can be used by the handheld device 12 for indoor positioning information—i.e. the access control still operates as a beacon. This architecture maintains backwards compatibility so that handheld devices that can only connect as a central can operate. But, if they can take advantage of the role switch, then the entire operation can be performed in a shorter amount of time.

As will be further described below, when the user indicates an intent to open the lock with their handheld device 12, such as via an application on the handheld device 12 to connect, iOS scans and connects to the access control 16 as a central and then automatically starts advertising as a peripheral while the connection is still open. That is, both a central and peripheral connection between two Bluetooth™ devices may not be open at the same time, so the access control 16 automatically disconnects and then connects back to the handheld device 12 as the central. It should be appreciated that these functions may be enacted in programmed software routines capable of execution in various microprocessor based electronics control embodiments of the handheld device 12 such that the access control 16 need not be modified to utilize the method 400.

In one example, the access control 16 is the peripheral that is initially advertising at a normal rate (step 402). The normal advertisement rate may be, for example, one (1) advertisement per second that provides about 2.5-years of battery life. Generally, more power is required to scan for advertisements than to generate advertisements.

The access control 16 is typically advertising particular information in accords with BLE, to include, but not be limited to, a serial number, Bluetooth™ ID value, status, and/or another identifier. The handheld device 12 is scanning for a specific identifier associated with the particular access control 16, (i.e. the identifier of a room that the guest has access to) For example, the identifier may be a serial number associated with a door lock previously received in a credential from the server 14.

When the user indicates an intent to open the particular access control 16 with their handheld device 12, such as by pushing a button on the handheld device 12, the handheld device 12 establishes a connection to the access control 16 (step 404). In one example, the connection operates with an about 20-30 millisecond connection interval. This connection interval may be a hard limit applied by certain operating systems of certain handheld devices to provide an interval between data packets to permit, for example, other BLE connections.

Immediately after the initial connection is established, and in response thereto, the handheld device 12 then automatically starts advertising as a peripheral. The standard operating mode for the access control 16 is being the peripheral, but after the initial connection is initiated, the access control 16 becomes a central and starts scanning in case it is an iOS handheld device that is trying to connect. However, if the access control 16 cannot discover any advertisements, then the access control 16 will stay in the peripheral role and not continue to steps 405 and beyond which facilitates backward compatibility.

The Bluetooth™ specification supports role switching during a connection which allows the two devices to trade roles without having to disconnect and reconnect. iOS does not support this role switching so the method 400 operates the iOS device to connects first as the central, start advertising as a peripheral, then, in response, the access control 16 drops the first connection when it finds the iOS device advertising as a peripheral, then connects as the central such that the access control 16 role is switched to an advertisement role (step 406). That is, the roles of operation are switched in response to the initial connection being achieved. The handheld device 12 commands the access control 16 to switch to the central role in response to the first wireless connection.

When switched to the advertisement role, the handheld device 12 may be set to advertise at a maximum advertisement rate. In this example, a maximum advertisement rate is about 32 times per second. Although this maximum advertisement rate may utilize more power, this usage is for only a relatively short period of time. That is, even with the reversal of roles, the connect/communicate/disconnect/connect occurs quickly which frees resources for other applications. The handheld device 12 becomes the peripheral, and the access control 16 becomes the central for a predetermined time period until either the second connection occurs or the predetermined time period lapses. That is, the reversal of roles may be time limited.

The handheld device 12 advertises information associated with the particular access control 16 to achieve a second connection (step 408). In one example, due to advertising at the maximum rate, the connection takes about 200 milliseconds to achieve. Because the access control 16 is then the central and 'owns' the connection, access control 16 can set the connection interval to a faster rate (e.g., 12.5 millisecond connection interval) to transfer the data more quickly and thereby activate the access control 16 more quickly. Since the second connection is operating at a maximum rate, the communication of the necessary data, i.e., to transfer the credential data to operate the access control 16, is increases overall performance and shortens the time experienced by the user. That is, even with the additional time associated with the reversal of roles which requires about 0.5 seconds, the overall time to operate the access control 16 is reduced from about 2.5 seconds to about 1.5 seconds.

Between the switch from the access control 16 advertising, to the handheld device 12 advertising, a disconnection of the initial connection may occur (step 405). Alternatively, both connections may be held open simultaneously. Should the second connection not occur within, for example, a predetermined time period, the access control 16 reverts to the advertisement role.

Although the battery life of the access control 16 may not be affected through use of the method 400, a faster connection and lock activation is achieved. The method of reversing the connection role has the lock start as the peripheral when the connection is first initiated but allows the roles to be reversed to improve the communications performance of particular brands of handheld devices. This is the typical, or normal rate of advertising to achieve a first or initial BLE connection between the handheld device 12 and the access control 16. That is, iOS does not limit the minimum connection interval that can be used when the handheld device 12 is the peripheral. The method of reversing the connection roles has the lock start as the peripheral when the connection is first initiated but allows the roles to be reversed to improve the communications performance.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method for operating a lock, comprising:
establishing a first wireless connection between a lock transceiver module coupled to the lock and a handheld device transceiver module, the lock transceiver module initially operating in a peripheral role and the handheld device transceiver module operating in a central role, wherein establishing the first wireless connection comprises transferring information associated with the lock;
switching a role of both the transceiver module and the handheld device transceiver module in response to establishing the first wireless connection and an intent of a user of the handheld device to operate the lock, the lock transceiver module switching from the peripheral role to the central role, and the handheld device transceiver module from the central role to the peripheral role;
establishing a second wireless connection between the lock transceiver module and the handheld device transceiver module subsequent to the switching, wherein establishing the second wireless connection comprises advertising information associated with the lock and reverting the lock transceiver module to the advertisement role in response to the second connection not occurring within a predetermined time period; and
operating the lock based on the information associated with the lock, wherein the information comprises at least one of a credential or an identifier.

2. The method as recited in claim 1, wherein at least one of the lock transceiver module and the handheld device transceiver module is a Bluetooth™ low energy (BLE) module that switches into the central role subsequent to the first wireless connection.

3. The method as recited in claim 1, further comprising disconnecting the first wireless connection prior to establishing the second wireless connection.

4. The method as recited in claim 1, further comprising maintaining the first wireless connection while establishing the second wireless connection.

5. The method as recited in claim 1, further comprising advertising from the handheld device at a maximum advertising rate subsequent to switching the role thereof.

6. The method as recited in claim 1, further comprising operating the first wireless connection at a normal transmission rate then operating the second wireless connection at a maximum transmission rate.

7. The method as recited in claim 1, further comprising wirelessly transmitting advertisements from the lock transceiver module according to a normal advertising rate for a Bluetooth™ low energy (BLE) module prior to establishing the first wireless connection.

8. The method as recited in claim 1, wherein the peripheral role has a peripheral role connection interval that is less than a central role connection interval of the central role.

9. The method as recited in claim 8, wherein, after the switching step, the lock transceiver module sets the connection interval to a faster rate.

10. A method for operating an access control, comprising:
wirelessly transmitting advertisements from the access control;
establishing a first wireless connection between the access control and a handheld device, the access control initially advertising in a peripheral role and the handheld device operating in a central role, wherein establishing the first wireless connection comprises transferring information associated with the access control;
switching the access control to a central role from the peripheral role and switching the handheld device to a peripheral role from the central role in response to the first wireless connection and an intent for a user of the handheld device to operate the access control;
establishing a second wireless connection between the access control and the handheld device subsequent to the switching, wherein establishing the second wireless connection comprises advertising information associated with the access control and reverting the access control to the advertisement role in response to the second connection not occurring within a predetermined time period; and
operating the access control based on the information associated with the access control, wherein the information comprises at least one of a credential or an identifier.

11. The method as recited in claim 10, further comprising disconnecting the first connection prior to establishing the second connection.

12. The method as recited in claim 10, further comprising wirelessly transmitting advertisements from the access control according to a normal advertising rate prior to establishing the first connection.

13. The method as recited in claim 10, further comprising wirelessly transmitting advertisements from the handheld device at a maximum transmission rate subsequent to the first wireless connection.

14. The method as recited in claim 13, wherein wirelessly transmitting advertisements at the maximum rate is at a rate of 32 times per second.

15. The method as recited in claim 10, wherein the handheld device commands the access control to switch into the central role subsequent to the first wireless connection.

16. The method as recited in claim 15, further comprising disconnecting the first wireless connection prior to establishing the second wireless connection.

17. The method as recited in claim 10, wherein the access control is a lock.

18. The method as recited in claim 10, wherein the peripheral role has a peripheral role connection interval that is less than a central role connection interval of the central role.

19. The method as recited in claim 18, wherein, after the switching step, a transceiver module of the access control sets the connection interval to a faster rate.

* * * * *